(12) United States Patent
Grace et al.

(10) Patent No.: US 7,650,513 B2
(45) Date of Patent: Jan. 19, 2010

(54) SYSTEM AND METHOD FOR VEHICLE-TO-VEHICLE MIGRATION OF MULTIMEDIA CONTENT

(75) Inventors: James R. Grace, Royal Oak, MI (US); Robert M. Riley, Jr., Albuquerque, NM (US); James M. Kortge, Ferndale, MI (US); Scott A. Rush, Plymouth, MI (US); Brian V. Sychta, Lake Orion, MI (US); Michael S. Schwartz, Molnlycke (SE)

(73) Assignee: GM Global Technology Operations, Inc., Detroit, MI (US)

( * ) Notice: Subject to any disclaimer, the term of this patent is extended or adjusted under 35 U.S.C. 154(b) by 907 days.

(21) Appl. No.: 11/172,380

(22) Filed: Jun. 30, 2005

(65) Prior Publication Data

US 2005/0273473 A1    Dec. 8, 2005

Related U.S. Application Data

(63) Continuation-in-part of application No. 11/036,213, filed on Jan. 14, 2005.

(60) Provisional application No. 60/538,043, filed on Jan. 21, 2004.

(51) Int. Cl.
*G06F 11/30* (2006.01)

(52) U.S. Cl. .................................... 713/193; 707/104.1

(58) Field of Classification Search ................. 713/155, 713/189, 193; 707/104.1, 9, 10; 709/231, 709/232
See application file for complete search history.

(56) References Cited

U.S. PATENT DOCUMENTS

| | | | |
|---|---|---|---|
| 5,339,446 A | 8/1994 | Yamasaki et al. |
| 5,341,503 A | 8/1994 | Gladstein et al. |
| 5,727,202 A | 3/1998 | Kucala |
| 5,822,600 A | 10/1998 | Hallowell et al. |
| 5,952,937 A | 9/1999 | Koopman et al. |

(Continued)

OTHER PUBLICATIONS

Bowman, et al. "MusicVis: A Visual Interface for Playlist Generation." Columbia University, 2001. URL: <http://www1.cs.columbia.edu/~paley/spring03/assignments/HWFINAL/bgb10/MusicVis_Poster.pdf.>.

*Primary Examiner*—Beemnet W Dada

(57) ABSTRACT

Systems and methods are provided for a multimedia storage and transfer. The system includes a first data storage device in a first vehicle, a wireless transceiver configured to communicate with a second data storage device in a second vehicle, and a controller coupled to the wireless transceiver and first data storage device. The first data storage device has an embedded database configured to store multimedia files. The embedded database has a list of multimedia file content. The controller is configured to remove the list of multimedia file content from the first data storage device and transfer the list of multimedia file content to the second data storage device via the wireless transceiver.

19 Claims, 3 Drawing Sheets

U.S. PATENT DOCUMENTS

| | | |
|---|---|---|
| 6,034,621 A | 3/2000 | Kaufman |
| 6,233,519 B1 * | 5/2001 | Yamada ..................... 701/200 |
| 6,248,946 B1 | 6/2001 | Dwek |
| 6,374,177 B1 | 4/2002 | Lee et al. |
| 6,470,358 B1 | 10/2002 | Beyda et al. |
| 6,546,456 B1 | 4/2003 | Smith et al. |
| 6,603,698 B2 | 8/2003 | Janzen |
| 6,728,729 B1 | 4/2004 | Jawa et al. |
| 6,820,230 B2 | 11/2004 | Sweeney |
| 7,010,808 B1 * | 3/2006 | Leung et al. .................. 726/26 |
| 7,043,477 B2 | 5/2006 | Mercer et al. |
| 7,058,814 B1 | 6/2006 | Zimmerman |
| 7,062,338 B1 | 6/2006 | Auflick et al. |
| 7,069,510 B2 | 6/2006 | Anderson et al. |
| 7,181,297 B1 | 2/2007 | Pluvinage et al. |
| 7,203,847 B2 | 4/2007 | Park |
| 7,243,104 B2 | 7/2007 | Bill |
| 7,343,414 B2 | 3/2008 | Lipscomb et al. |
| 7,346,687 B2 | 3/2008 | Lipscomb et al. |
| 7,398,524 B2 | 7/2008 | Shapiro |
| 2002/0087625 A1 | 7/2002 | Toll et al. |
| 2002/0174243 A1 | 11/2002 | Spurgat et al. |
| 2002/0194468 A1 | 12/2002 | Betts-LaCroix et al. |
| 2003/0018975 A1 | 1/2003 | Stone |
| 2003/0114133 A1 | 6/2003 | Enners |
| 2003/0182315 A1 | 9/2003 | Plastina et al. |
| 2003/0215102 A1 | 11/2003 | Marlowe |
| 2004/0021351 A1 | 2/2004 | House |
| 2004/0029621 A1 | 2/2004 | Karaoguz et al. |
| 2004/0036625 A1 * | 2/2004 | Omata et al. ........... 340/825.69 |
| 2004/0151327 A1 | 8/2004 | Marlow |
| 2004/0158860 A1 | 8/2004 | Crow |
| 2004/0225519 A1 | 11/2004 | Martin |
| 2004/0242224 A1 * | 12/2004 | Janik et al. ............... 455/426.1 |
| 2004/0264709 A1 | 12/2004 | Yona |
| 2005/0021398 A1 | 1/2005 | McCleskey et al. |
| 2005/0172154 A1 * | 8/2005 | Short et al. .................. 713/201 |
| 2005/0195975 A1 * | 9/2005 | Kawakita ..................... 380/30 |
| 2006/0029109 A1 * | 2/2006 | Moran ........................ 370/538 |
| 2006/0194549 A1 | 8/2006 | Janik et al. |
| 2006/0206492 A1 | 9/2006 | Lipscomb et al. |
| 2006/0206493 A1 | 9/2006 | Lipscomb et al. |
| 2006/0206582 A1 | 9/2006 | Finn |
| 2008/0039108 A1 | 2/2008 | Shapira |

* cited by examiner

SYSTEM AND METHOD FOR VEHICLE-TO-VEHICLE MIGRATION OF MULTIMEDIA CONTENT

CROSS-REFERENCE TO RELATED APPLICATION

This application is a continuation-in-part of U.S. Ser. No. 11/036,213 filed Jan. 14, 2005, which claims the benefit of U.S. Provisional Ser. No. 60/538,043, filed Jan. 21, 2004.

TECHNICAL FIELD

The present invention generally relates to transfer and storage of multimedia information in a motor vehicle, and more particularly relates to the use of a hard disk drive and applications of a hard disk drive in a motor vehicle.

BACKGROUND

Vehicle operators tend to spend a significant amount of time in their vehicles particularly when commuting from a home to a workplace, running errands, conducting business, vacationing, or for many other reasons. This time is significant enough that some vehicles come equipped with a variety of consumer electronics such as compact disc (CD) players, cassette tape players, radios, satellite radios, electronic gaming, and digital video disc (DVD) players. Some owners may also choose to equip their vehicle with aftermarket consumer electronics in the event their vehicles lack such consumer electronics or for purposes of customization. These and other entertainment or infotainment electronic devices provide a passenger in the vehicle with time-occupying options and may improve the passenger's quality of time.

Consumer electronics such as CD players, cassette tape players, DVD players, and electronic gaming generally have related media content for playback residing on a localized storage medium. For example, many on-board navigation systems utilize geographic information stored on CDs. This information may be downloaded to a memory specifically associated with the navigation system, located in the vehicle, or directly accessed from the CD by the navigation system. In another example, CD players commonly play media that is stored on CD. Most of these playback devices can accept a limited number of storage media during operation and thereby generally have a relatively limited capacity of media selection. For example, a CD player with a six-disc CD changer has a selection of music tracks that are limited to any six CDs contained in the CD changer.

With multimedia that is stored on various mediums, such as CD or DVD, digital rights management (DRM) has become prominent. For example, many performances that are recorded onto CDs are copyright protected. Additionally, access to such recordings may be limited to certain types of playback devices in an attempt to prevent unauthorized duplication of the recordings. For example, some CDs may be limited to playback on a conventional stand-alone CD player having a read-only operation but not on a CD drive found to accompany personal computers where unauthorized duplication may occur.

Accordingly, it is desirable to provide an infotainment system for a vehicle that stores a variety of multimedia files on an embedded storage device. Because of the time investment involved in loading the storage device with desired content, it is desirable to provide a vehicle data storage and transfer system having stored multimedia files that may be transferred to another vehicle while preserving DRM protected content. Finally, other desirable features and characteristics of the present invention will become apparent from the subsequent detailed description and the appended claims, taken in conjunction with the accompanying drawings and the foregoing technical field and background.

BRIEF SUMMARY

Systems and methods are provided for multimedia storage and transfer. In a first exemplary embodiment, a multimedia storage and transfer system for a vehicle includes, but is not limited to, a first data storage device in a first vehicle, a wireless transceiver configured to communicate with a second data storage device in a second vehicle, and a controller coupled to the wireless transceiver and first data storage device. The first data storage device has an embedded database configured to store multimedia files. The embedded database has a list of multimedia file content. The controller is configured to remove the list of multimedia files and the content associated with that list from the first data storage device and transfer the list of multimedia file and content to the second data storage device via the wireless transceiver.

In a second exemplary embodiment, an infotainment system for a motor vehicle includes, but is not limited to, a hard drive of a first vehicle, a wireless transceiver configured to communicate with a data storage device of a second vehicle, an encryption unit having an encoder configured to encode digital rights management (DRM) protected multimedia files, and a controller coupled to the hard drive, the wireless transceiver, and the encryption unit. The hard drive has an embedded database configured to store multimedia files. The embedded database has a list of multimedia file content. The controller is configured to remove the list of multimedia files and the associated content from the hard drive and transfer the list of multimedia files and content to the data storage device of the second vehicle.

In a third exemplary embodiment, a method for transferring multimedia content in motor vehicles includes identifying DRM protected multimedia files in an embedded database of a first vehicle, transferring multimedia files from the embedded database to a second vehicle, and removing the DRM protected multimedia files and DRM playback rights associated with the DRM protected multimedia files from the first vehicle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
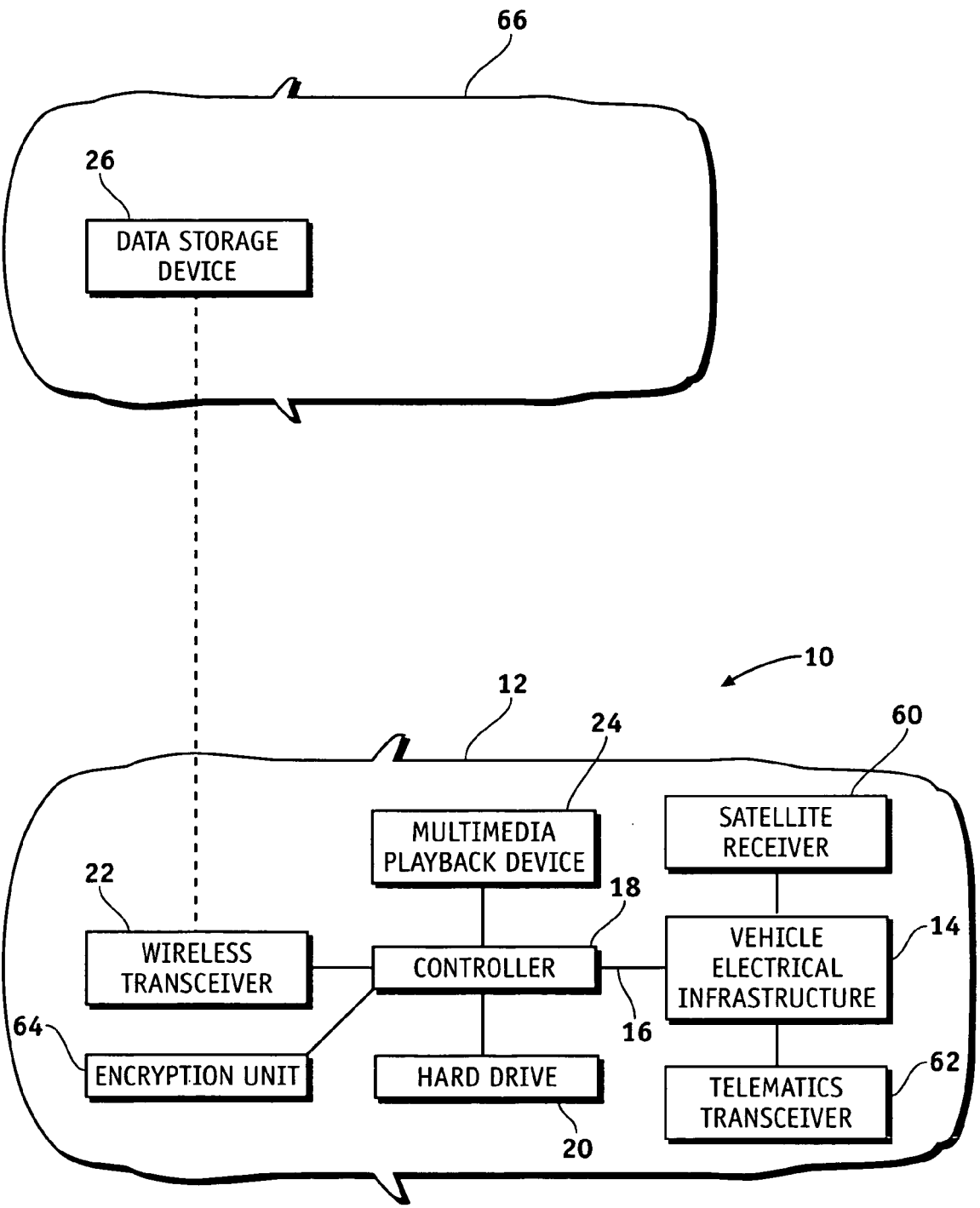
FIG. 1 is a schematic diagram illustrating a first exemplary embodiment of an electronic vehicle storage system in a vehicle.

Referring to the drawings, FIG. 1 is a schematic diagram illustrating a first exemplary embodiment of a multimedia storage and transfer system 10 in a vehicle 12. In a more basic exemplary embodiment, the electronic vehicle storage system 10 includes a vehicle electrical infrastructure 14, a vehicle communications network 16 coupled to the vehicle electrical infrastructure 14, a controller 18 coupled to the vehicle electrical infrastructure 14, such as via the vehicle communications network 16, and a data storage device 20 coupled to the controller 18 and configured to store multimedia files.

The data storage device 20 and controller 18 are integrated with the vehicle 12. The controller 18 communicates with the vehicle electrical infrastructure 14, such as to receive current status information regarding various vehicle electrical systems/subsystems, as described in greater detail hereinafter. The data storage device 20 includes an embedded database containing a list of content that may be accessed by the controller 18 to associate a recognized multimedia file with a corresponding content from the list of content. A variety of multimedia storage/playback devices may be directly coupled to the electronic vehicle storage system 10, such as a multimedia playback 24 device located in the vehicle 12 (e.g., in-dash radio receiver and CD player) or a portable storage/playback device (e.g., MP3 player) via a universal serial bus (USB) connection, firewire, or other conventional one-way or two-way communication line. Additionally, a remote storage/playback device 26 may be wirelessly coupled with the electronic vehicle storage system 10, as described in greater detail hereinafter. The electronic vehicle storage system 10 provides a user with access to generally more audio or other multimedia content than found in conventional CD players.

As used herein, the term "file" refers to any data that is stored at one or more sources and is to be delivered as a unit to one or more destinations. For example, a document, an image, and a file from a file server or computer storage device, are all examples of "files" that may be delivered. Files can be of known size (such as a one megabyte image stored on a hard disk) or can be of unknown size (such as a file taken from the output of a streaming source).

The vehicle electrical infrastructure 14 may include various systems and/or subsystems on the vehicle 12, including by way of example and not of limitation a human vehicle interface, a battery power management system, an engine management system, a transmission management system, a body control module, and vehicle subsystems such as an antilock brake system (ABS). The data storage device 20 and controller 18 communicate over the vehicle communications network, such as controller area network (CAN) and J1850 type communication protocols, to transfer information to and from the vehicle systems and subsystems.

In one exemplary embodiment, the data storage device 20 is a hard disk drive, or hard drive, that has at least one platter/disk (not shown) accessed by a read/write head(s) (not shown) to transfer data from/to the platter/disk. The hard drive 20 may store a variety of data including, but not limited to, multimedia files, such as audio files, and a variety of status and diagnostic information from the various systems and subsystems of the vehicle 12, such as antilock brake system (ABS) status information. The hard drive 20 is located in the vehicle 12 and is wired to the vehicle electrical infrastructure 14, such as via the controller 18. Although the data storage device 20 is described herein in the context of a hard drive, a variety of other types of mass storage devices may also be used that have read/write capability.

As previously mentioned, the controller 18, such as a microprocessor or other conventional processing device, is coupled to the hard drive 20 to access information on the hard drive 20, direct transfer of information to/from the hard drive 20, and optionally communicate with various systems and/or subsystems on the vehicle 12. Although the controller 18 is shown as a separate device from the hard drive 20, the combined configuration of the controller 18 and hard drive 20 is not critical to the electronic vehicle storage system 10. For example, in another exemplary embodiment, the hard drive 20 incorporates the controller 18 such that the hard drive 20 and controller 18 is a single module.

The hard drive 20 may optionally communicate over a wireless network including, but not limited to, Wi-Fi, Bluetooth, a cellular network, or the like, to transfer information to and from remote systems, such as a key fob and a personal computer. One or more of a variety of networking or communication devices may be coupled with the controller 18. In one embodiment, a wireless transceiver 22 is coupled to the controller 18. A satellite receiver 60 or telematics transceiver 62 may also be coupled to the vehicle electrical infrastructure 14 and communicate with the controller 18.

For example, the hard drive 20 may communicate with a telematics provider, such as OnStar, to transfer information from a remote system using a cellular/satellite network and the Internet or other similar computer network. The particular wireless network or transceiver is not critical to the operation of the electronic vehicle storage system 10 provided each is compatible with the other. Those of skill in the art will appreciate that the wireless transceiver 22 may be embodied by one or more of a variety of different conventional wireless receivers, transmitters, and transceivers to transfer information between the hard drive 20 and a remotely located (i.e., external to the vehicle) multimedia storage system/device.

Each multimedia file has a corresponding multimedia file content. More than one multimedia file may be stored in a portable storage medium, stored in the hard drive 20, transferred to/from the wireless transceiver 22, or otherwise processed by the various components of the electronic vehicle storage system 10. Examples of conventional portable storage medium include, by way of example and not limitation, CD, digital video disc (DVD), read-only memory (ROM), programmable ROM types, random access memory (RAM), floppy disk, magnetic tape, flash memory, hard disk, and the like.

Content from a CD, such as an in-dash CD player coupled to the data storage device 20 or a CD drive integrated with the data storage device, may be transferred to the data storage device 20. For example, the user may insert a normal audio CD and copy content from the CD on to the data storage device 20. The controller 18 recognizes the content of the CD using the embedded database to associate the CD with a list of the content on the CD. If a CD is inserted into the system 10 that is not recognized by the controller 18, a telematics connection is established by the controller 18 via the wireless transceiver 22 or telematics transceiver 62 to a remote storage/playback device (not shown), such as a remote server. Information regarding the inserted CD, such as genre, artist, album, may be retrieved from a database on the server by the controller 18, downloaded to the hard drive 20, and stored with the embedded database. The embedded database may also be updated by receiving broadcast updates through the wireless transceiver 22 and downloading the updates to the hard drive 20. Content from a variety of other storage mediums may also be transferred to the hard drive 20, such as from a DVD player or an MP3 player.

In one exemplary embodiment, the multimedia content in the vehicle 12 may be transferable to a receiving vehicle 66 having a data storage device 26. The controller 18 may select a portion of the multimedia files stored in the hard drive 20 or all of the multimedia files stored therein for transfer via the wireless transceiver 22. The multimedia files may be compressed and modulated into communication signals for transmission by the wireless transceiver 22 using conventional signal processing techniques, and the data storage device 26 of the receiving vehicle 66 directly may receive such communication signals via a receiver (not shown) such as the wireless transceiver 22 of the multimedia storage and transfer system 10 associated with the originating vehicle 12.

Any multimedia files that are stored in the hard drive 20, such as may be obtained from a multimedia playback device 24, a portable storage device, or received from a wireless transmission (e.g., via the telematics transceiver 62, satellite receiver 60, or wireless transceiver 22), may be transferred to the data storage device 26 of the receiving vehicle 66. For preservation of DRM protected content, as described in greater detail hereinbelow, transfer of the multimedia files includes: encryption of the DRM protected content; transfer of the corresponding list of multimedia content to the receiving vehicle 66; and removal of the same multimedia files and corresponding list of multimedia content from the originating vehicle 12 such that any playback rights that may be associated with the transferred multimedia files are transferred to the receiving vehicle 66.

An encryption unit 64 may optionally be coupled to the controller 18 for encrypting multimedia files that may be DRM protected. In this exemplary embodiment, the encryption unit 64 has an encoder that uses a public key associated with the originating vehicle 12 for encrypting the DRM protected content. The controller 18 may determine or select which multimedia files stored in the hard drive 20 require preservation of DRM. For example, in some conventional media recordings playback is enabled in stand-alone CD or DVD players and disabled in CD or DVD read/write drives typically used with personal computers. The corresponding CD or DVD may contain coding to implement this enable/disable feature. In this example, the controller 18 is configured to identify such coding for designated DRM protected content and direct the encryption unit 64 to encode transferred multimedia files with the public key. In another exemplary embodiment, the encryption unit 64 may be configured to encode all multimedia files that are transferred to the hard drive 20 so as to fulfill DRM protection requirements.

The encoder encrypts each multimedia file requiring preservation of DRM with the public key such that playback of the encrypted multimedia file requires knowledge of the public key. Transfer of the DRM encrypted multimedia files to the receiving vehicle 66 includes transfer of the public key to the receiving vehicle 66 and removal of the public key from the originating vehicle by the controller 18 to preserve DRM. Although the encryption unit 64 is described in the context of using public key based encoding, a variety of other conventional encryption techniques may be used.

Figure 2:
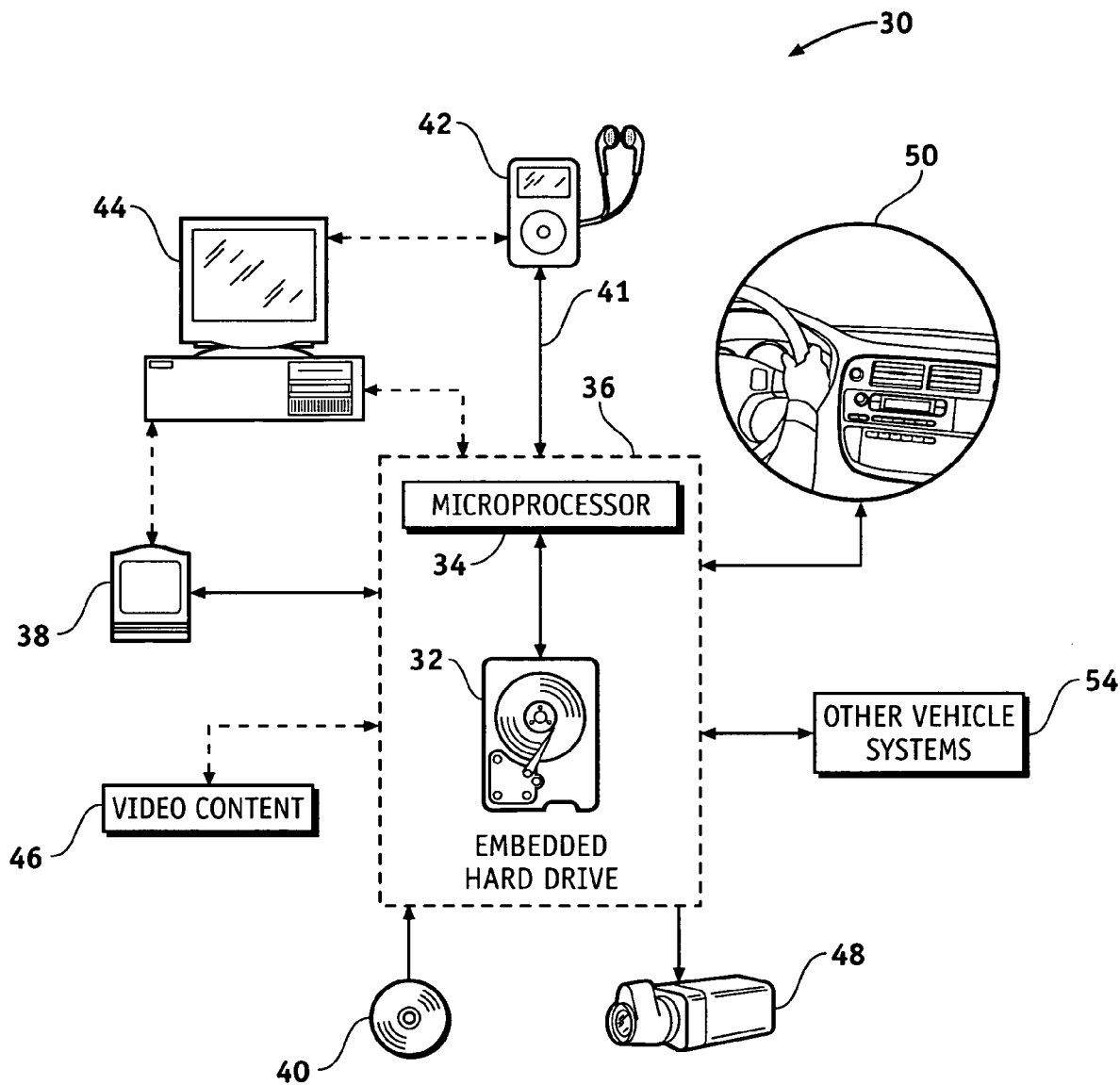
FIG. 2 is a block diagram of a second exemplary embodiment of electronic vehicle storage system.

FIG. 2 is a block diagram illustrating communication between components of an electronic vehicle storage system 30. In this embodiment, a hard drive 32, such as the hard drive 20 shown in FIG. 1, has an embedded database containing a list of multimedia file content. A controller 34, such as the controller 18 shown in FIG. 1, is a microprocessor that is coupled to the hard drive 32. Routing of communication from various components of the electronic vehicle storage system 30 to the data storage device 36 may vary between the hard drive 32 and the microprocessor 34.

For simplicity of explanation in this exemplary embodiment, the hard drive 32 and the microprocessor 34 are together referred to as a data storage device 36. For example, control signals may be communicated between the microprocessor 34 and the wireless transceiver 22 shown in FIG. 1, and multimedia files may be wirelessly transferred from a personal computer 44 (PC) to the hard drive 32. In this example, such control signal communication and multimedia file transfer together establish communication between the data storage device 36 and the personal computer 44. The particular routing of communication among the hard drive 32, the microprocessor 34, and other components of the electronic vehicle storage system 30 is not critical to the operation of the same.

The hard drive 32 stores multimedia files such as found on conventional CDs, DVDs, and other storage mediums. Multimedia files may be downloaded to the data storage device 36 from any number of devices. As best shown in FIG. 2, multimedia files may be downloaded to the data storage device 36 from a conventional CD 40, a compressed audio CD 38 that may be used to store compressed digital audio files such as MP3 files or the like, a portable storage/player device 42 such as a DVD player, a video content storage/player device 46 such as a digital video recorder (DVR), and a personal computer 44. In one exemplary embodiment, the multimedia files are stored as compressed files on the hard drive 32.

As previously mentioned hereinabove, to preserve DRM protected multimedia files, a public key encoding system may be used to encrypt such multimedia files. For example, a vehicle identification number (VIN) may be used as the public key. In a wireless transfer configuration, the vehicle's public key may be transmitted over the wireless network to the remotely connected personal computer 44, portable storage/player device 42, video content storage/player device 46, or data storage device 26 (FIG. 1) of the receiving vehicle 66 (FIG. 1) to be used for encrypting content. For an end-to-end DRM scheme, the originating vehicle, such as the vehicle 12 shown in FIG. 1, may authenticate using the VIN as the public key before transfer of content thereto while also preserving DRM protected content from subsequent transfer out of the vehicle 12.

Wireless transfer of multimedia files is accomplished using a wireless transceiver such as the wireless transceiver 22 shown in FIG. 1. In one exemplary embodiment, content may be synchronized by the microprocessor 34 between the electronic vehicle storage system 30 in the vehicle 12 (FIG. 1) and a remote storage/playback device 26 (FIG. 1) such as the home PC 44. For example, a music collection of audio files stored on the data storage device 36 may be synchronized with a music collection of audio files stored on the home PC 44. In this example, the microprocessor 34 may compare the content on the hard drive 32 with the content on the home PC 44 and transfer content acquired on the PC 44 to the vehicle 12 (FIG. 1). In this exemplary embodiment, content that may have been "ripped" from purchased CDs onto the hard drive 32 may be transferred from the PC 44 to the hard drive 32.

In one exemplary embodiment, the data storage device 36 has a port 41 for coupling the portable data storage device 42 to the data storage device 36. The port may be a universal serial bus (USB) port, firewire connection, or the like. In this embodiment, the microprocessor 34 is configured to transfer public key encoded multimedia files from the hard drive 32 to the portable data storage device 42 via said USB connection 41. Retrieval of the multimedia files on the portable data storage device 42 is restricted to access using the public key by the originating vehicle of the public key encoded multimedia files, such as the originating vehicle 12 shown in FIG. 1.

Being coupled with other vehicle systems 54, the data storage device 36 may record diagnostic and status information to the hard drive 32 to record vehicle operation states as time passes. This embodiment is particularly useful as an automotive "black box" where the data storage device 36 may be recovered in the event of a crash of the vehicle 12 (FIG. 1). The status information of various vehicle systems 54 stored in the data storage device 36 may be used to determine information about the crash. Additionally, the data storage device 36 may record diagnostic information relevant to the vehicle history and service to the hard drive 32. This information may be used by service professionals when repairing or performing maintenance on the vehicle 12 (FIG. 1).

The user interface 50 displays the contents of the multimedia files stored on the hard drive 32, such as a music library, in the vehicle 12 (FIG. 1) and provides navigation, such as music navigation using a rotating knob or push button, among the multimedia files. In one exemplary embodiment, the data storage device 36 monitors and determines listening habits of the user, such as by associating an audio file with a corresponding content. Based on the determined listening habits, the microprocessor 34 may generate a playlist so that browsing by the user to a particular content is not necessary. In one example, a "one-touch" scheme may be used to automatically generate the playlist. The entire contents of the music library may be displayed such as on a display bar. For example, a current position within the music library may be marked using an indicator, such as a pointer, along the display bar. The user can move through the music library by rotating a knob counter clockwise and clockwise. The music library may be marked along the display bar by genres, artists, albums, etc. A softkey may also be used to "jump" to a specific place along the display bar. Although the user interface 50 is described herein with regard to the music library, a general multimedia library may also be displayed for navigation. The video system 48 may include a monitor and related electronics to display video images such as from content associated with a DVD.

In one exemplary embodiment, the user interface 50 provides controls to rip/copy an entire CD (compressed or normal), DVD, or other portable storage medium to the hard drive 34. In another exemplary embodiment, the user interface 50 provides controls to rip/copy specific tracks or files contained on the CD, DVD, or other portable storage medium. For example, during playback of the portable storage medium, the user may select a currently played track or file for ripping/copying to the hard drive 34. Additionally, the user interface 50 may provide a control to delete the currently played track or file from the hard drive 34. The user interface 50 displays the specific tracks or files that have been ripped/copied to the hard drive 34 from the portable storage medium. In this embodiment, the user has flexibility to selectively store and prune content recorded to the hard drive 34.

Rip or copy speed of multimedia files to the hard drive 34 may be limited due to shock and vibration while the vehicle 12 (FIG. 1) is in motion. In one exemplary embodiment, the hard drive 34 has a variable rip speed that dynamically adjusts based on vehicle movement. By coupling the microprocessor 36 to the various vehicle systems/subsystems, such as a body control module or throttle control module, the microprocessor 36 may increase or decrease rip speed based on status information communicated from such vehicle systems/subsystems. For example, the rip speed of the hard drive may be increase while the vehicle is not moving to maximize transfer time.

Figure 3:
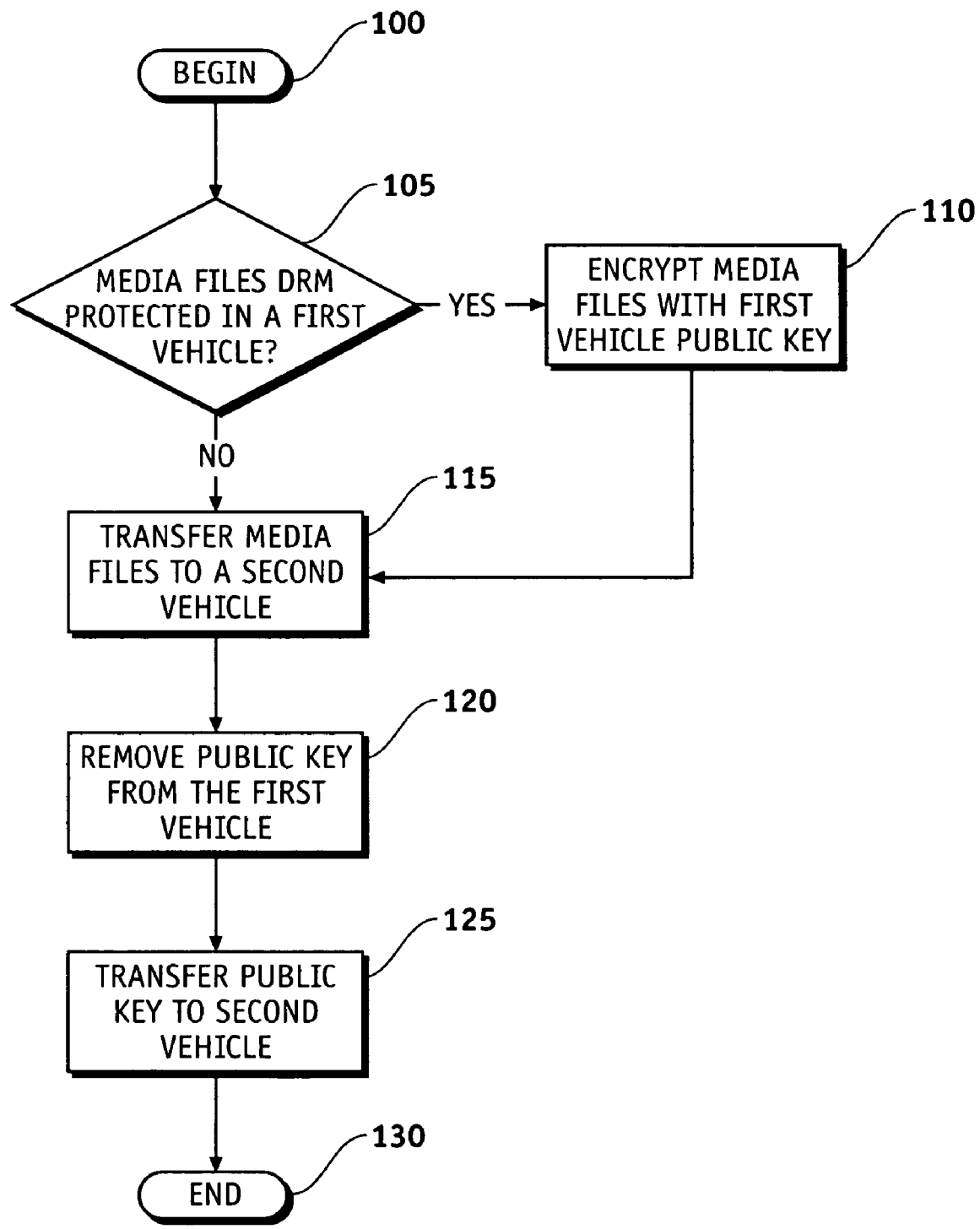
FIG. 3 is a flow diagram of a method of transferring multimedia content in motor vehicles according to an exemplary embodiment.

FIG. 3 is a flow diagram of a method of transferring multimedia content in motor vehicles according to an exemplary embodiment. The method begins at 100. The controller 18 (FIG. 1) identifies DRM protected multimedia files in the hard drive 20 (FIG. 1) of a first vehicle, such as the originating vehicle 12 shown in FIG. 1, at step 105. For example, some multimedia files that are transferred to the hard drive 20, such as from a remote storage/playback device 26 (FIG. 1) or a portable data storage device 42 (FIG. 2), may have coding that restricts playback or duplication of such files, as previously mentioned hereinabove, or may require encoding/encryption to preserve DRM protection.

In one exemplary embodiment, multimedia files requiring DRM protection in the embedded database of the first vehicle are determined by the controller 18 (FIG. 1) and encrypted with a public key associated with the first vehicle at step 110. The public key may be a VIN or other unique identifier corresponding to the first vehicle. This public key resides with the controller 18 (FIG. 1) on the first vehicle 12 (FIG. 1) to permit access by the system 10, such as for playback or transfer, to the encrypted multimedia files stored on the hard drive 20 (FIG. 1).

Multimedia files are transferred from the database or hard drive 20 (FIG. 1) of the first vehicle 12 (FIG. 1) to a second vehicle, such as the receiving vehicle 66 shown in FIG. 1, at step 115 via a wireless transmitter or transceiver, such as the wireless transceiver 22 shown in FIG. 1. Although transfer of an entire database of multimedia files is preferred for content migration from one vehicle to another vehicle, such as from the originating vehicle 12 shown in FIG. 1 to the receiving vehicle 66 shown in FIG. 1, a portion of the database of multimedia files in the originating vehicle 12 may be transferred to the receiving vehicle 66.

The DRM protected multimedia files and DRM playback rights associated with the DRM protected multimedia files are removed from the originating vehicle 12 (FIG. 1) at step 120. To preserve the rights associated with DRM protected content, it may be required that residual copies, such as backup copies or the like, of the multimedia files transferred to the receiving vehicle 66 (FIG. 1) are removed or erased from the hard drive 20 (FIG. 1) of the originating vehicle 12 (FIG. 1). Similarly, the public key used by the controller 18 (FIG. 1) in the originating vehicle 12 (FIG. 1) to formerly access the multimedia files prior to being transferred to the receiving vehicle 66 (FIG. 1) may be removed or erased from the hard drive 20 (FIG. 1) of the originating vehicle 12 (FIG. 1).

This public key is transferred to the receiving vehicle 66 (FIG. 1) at step 125 via the wireless transceiver 22 (FIG. 1). With the public key, the receiving vehicle 66 (FIG. 1) may access the transferred encoded multimedia files for playback while preserving DRM protection thereof. Although transfer of the multimedia files from the originating vehicle 12 (FIG. 1) to the receiving vehicle 66 (FIG. 1) has been described hereinabove in the context of wireless transfer, other methods of transferring the multimedia content may be used, such as a hardwire connection using for example a serial bus to connect the hard drive 20 (FIG. 1) in the originating vehicle 12 (FIG. 1) with the data storage device 26 (FIG. 1) in the receiving vehicle 66 (FIG. 1).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A multimedia storage and transfer system for a vehicle, said system comprising:
   a first data storage device in a first vehicle, said first data storage device comprising an embedded database configured to store multimedia files, said embedded database comprising a first list of multimedia file content;
   a wireless transceiver configured to communicate with a second data storage device in a second vehicle; and
   a controller coupled to said wireless transceiver and said first data storage device, said controller configured to migrate the multimedia files from the first vehicle to the second vehicle by:
      removing said first list of multimedia file content from said first data storage device; and
      transferring said first list of multimedia file content to said second data storage device via said wireless transceiver.

2. A multimedia storage and transfer system according to claim 1, wherein said first data storage device is a hard disk drive having a memory; and where said multimedia files are digital compressed multimedia files.

3. A multimedia storage and transfer system according to claim 1 further comprising a telematics transceiver coupled to said controller; and
   wherein said controller is further configured to associate a recognized multimedia file from said embedded data base with a multimedia file content from said list of multimedia file content, said telematics transceiver configured to retrieve multimedia file content corresponding to a non-recognized multimedia file.

4. A multimedia storage and transfer system according to claim 1 further comprising a media playback device coupled to said controller, said media playback device configured to retrieve multimedia files from a storage medium, said controller further configured to transfer said retrieved multimedia files from said media playback device to said embedded database of said first data storage device.

5. A multimedia storage and transfer system according to claim 4, wherein said media playback device is selected from a compact disc (CD) player, a magnetic tape player, a compressed digital audio player, a mini-disc player, and a digital video disc (DVD) player.

6. A multimedia storage and transfer system according to claim 1 further comprising a satellite receiver coupled to said controller, said satellite receiver configured to receive a second list of multimedia file content, said controller further configured to update said first list of multimedia file content with said second list of multimedia file content in said first data storage device.

7. An infotainment system for a motor vehicle, said infotainment system comprising:
   a hard drive of a first vehicle, said hard drive comprising an embedded database configured to store multimedia files, said embedded database comprising a list of multimedia file content;
   a wireless transceiver configured to communicate with a data storage device of a second vehicle;
   an encryption unit comprising an encoder configured to encode digital rights management (DRM) protected multimedia files; and
   a controller coupled to said hard drive, said wireless transceiver, and said encryption unit, said controller configured to migrate the multimedia files from the first vehicle to the second vehicle by:
      removing said list of multimedia content from said hard drive; and
      transferring said list of multimedia content to said data storage device of said second vehicle.

8. A multimedia storage and transfer system according to claim 7 further comprising a media playback device configured to retrieve multimedia files stored on a portable storage medium; and
   wherein said controller is further configured to transfer said retrieved multimedia files of said media playback device to said hard drive, said hard drive further configured to store said retrieved multimedia files of said media playback device in said embedded database.

9. A multimedia storage and transfer system according to claim 8, wherein said encoder is further configured to encode said multimedia files stored on said embedded database with a public key, said public key associated with said first vehicle.

10. A multimedia storage and transfer system according to claim 9, wherein said first vehicle has a vehicle identification number (VIN); and wherein said public key is based on said VIN.

11. A multimedia storage and transfer system according to claim 9, wherein said controller is further configured to:
   transmit said public key via said wireless transceiver to said second vehicle with said list of multimedia file content; and
   remove said public key from said first vehicle.

12. A multimedia storage and transfer system according to claim 9, further comprising a digital media write device coupled to said controller; and
   wherein said controller is further configured to transfer public key encoded multimedia files stored on said embedded database to said digital media write device, said digital media write device configured to transfer said public key encoded multimedia files to a data storage medium.

13. A multimedia storage and transfer system according to claim 12, wherein said data storage medium is selected from a CD, a DVD, a mini-disc, an optical disc, a magnetic tape, and a floppy disk.

14. A multimedia storage and transfer system according to claim 9 further comprising a portable data storage device interface coupled to said controller.

15. A multimedia storage and transfer system according to claim 14, wherein said data storage device interface is a universal serial bus (USB) connection; and wherein said controller is further configured to transfer public key encoded multimedia files from said embedded database to a portable data storage device via said USB connection.

16. A multimedia storage and transfer system according to claim 8, wherein said media playback device is selected from a CD player, a magnetic tape player, a compressed digital audio player, a mini-disc player, and a DVD player.

17. In a motor vehicle having a database of multimedia files, a method for transferring migrating multimedia content from a first vehicle to a second vehicle, said method comprising the steps of:
   identifying DRM protected multimedia files in an embedded database of the first vehicle;
   transferring multimedia files from the embedded database to the second vehicle;
   transferring a public key to the second vehicle;
   removing the DRM protected multimedia files and DRM playback rights associated with the DRM protected multimedia files from the first vehicle; and wherein said DRM playback right removing step comprises the step of:
    transferring the public key to the second vehicle; and
    removing the public key from the first vehicle.

18. A method for transferring multimedia content according to claim 17 further comprising the steps of:
    determining multimedia files requiring DRM protection in the embedded database of the first vehicle; and
    encrypting multimedia files in the embedded data base with a public key associated with the first vehicle.

19. A method for transferring multimedia content according to claim 17, wherein said transferring step comprises wirelessly transferring the multimedia files to the second vehicle.

* * * * *